US011007672B2

(12) United States Patent
Okazaki

(10) Patent No.: US 11,007,672 B2
(45) Date of Patent: May 18, 2021

(54) CERAMIC HONEYCOMB STRUCTURE AND ITS PRODUCTION METHOD, AND HONEYCOMB-MOLDING DIE

(71) Applicant: HITACHI METALS, LTD., Tokyo (JP)

(72) Inventor: Shunji Okazaki, Miyako-gun (JP)

(73) Assignee: HITACHI METALS, LTD., Tokyo (JP)

( * ) Notice: Subject to any disclaimer, the term of this patent is extended or adjusted under 35 U.S.C. 154(b) by 272 days.

(21) Appl. No.: 15/515,184

(22) PCT Filed: Sep. 30, 2015

(86) PCT No.: PCT/JP2015/077878
§ 371 (c)(1),
(2) Date: Mar. 29, 2017

(87) PCT Pub. No.: WO2016/052680
PCT Pub. Date: Apr. 7, 2016

(65) Prior Publication Data
US 2017/0216747 A1    Aug. 3, 2017

(30) Foreign Application Priority Data
Sep. 30, 2014 (JP) .............................. JP2014-201888

(51) Int. Cl.
*B28B 3/26* (2006.01)
*C04B 38/00* (2006.01)
(Continued)

(52) U.S. Cl.
CPC .......... *B28B 3/269* (2013.01); *B01D 39/2068* (2013.01); *B01D 46/247* (2013.01);
(Continued)

(58) Field of Classification Search
CPC .............................. B28B 3/269; B23P 15/243
(Continued)

(56) References Cited

U.S. PATENT DOCUMENTS 4,349,329 A * 9/1982 Naito ...................... B28B 3/269
                                                          425/461
4,840,827 A   6/1989 Mizutani et al.
(Continued)

FOREIGN PATENT DOCUMENTS

EP   1977810 A1   10/2008
EP   2368618 A1    9/2011
(Continued)

OTHER PUBLICATIONS

International Search Report of PCT/JP2015/077878, dated Dec. 1, 2015. [PCT/ISA/210].
(Continued)

*Primary Examiner* — Erin Snelting
(74) *Attorney, Agent, or Firm* — Sughrue Mion, PLLC

(57) ABSTRACT

A ceramic honeycomb structure comprising a ceramic honeycomb body having pluralities of longitudinal flow paths partitioned by square-lattice-cross-sectioned cell walls, and an outer peripheral wall formed on an outer periphery of the ceramic honeycomb body; the outermost peripheral cell wall of the ceramic honeycomb body having an outer peripheral surface shape reflecting the square lattice shapes of the cell walls; the thickness of the outer peripheral cell wall being larger than the thickness of the cell walls; and the outer peripheral wall being formed to cover an outer peripheral surface of the outer peripheral cell wall.

7 Claims, 9 Drawing Sheets

(51) Int. Cl.
  *B28B 3/20* (2006.01)
  *B01D 46/24* (2006.01)
  *B01D 39/20* (2006.01)
(52) U.S. Cl.
  CPC ..... *B01D 46/2455* (2013.01); *B01D 46/2474* (2013.01); *B28B 3/20* (2013.01); *B28B 3/26* (2013.01); *C04B 38/0006* (2013.01); *B01D 2046/2481* (2013.01); *B01D 2046/2485* (2013.01); *B01D 2046/2492* (2013.01); *B01D 2046/2496* (2013.01); *B01D 2279/30* (2013.01); *C04B 2235/6021* (2013.01)
(58) Field of Classification Search
  USPC ......................................................... 264/630
  See application file for complete search history.

(56) References Cited

U.S. PATENT DOCUMENTS

| | | | | |
|---|---|---|---|---|
| 5,188,779 | A | | 2/1993 | Horikawa et al. |
| 5,256,054 | A | * | 10/1993 | Cocchetto ............... B28B 3/269 425/462 |
| 5,466,415 | A | * | 11/1995 | Brundage ............... B28B 3/269 419/35 |
| 5,728,286 | A | * | 3/1998 | Suzuki ..................... B23H 9/00 205/640 |
| 2002/0098320 | A1 | * | 7/2002 | Beall ........................ B01J 35/04 428/116 |
| 2002/0185776 | A1 | | 12/2002 | Shibagaki et al. |
| 2005/0118296 | A1 | * | 6/2005 | Kaneko .................... B23H 9/00 425/380 |
| 2005/0255288 | A1 | | 11/2005 | Noguchi et al. |
| 2006/0103043 | A1 | * | 5/2006 | Rector ..................... B28B 3/269 264/40.7 |
| 2007/0026188 | A1 | * | 2/2007 | Bookbinder ............ B29C 48/30 428/73 |
| 2008/0203626 | A1 | * | 8/2008 | Ohno ................... B01D 46/0001 264/630 |
| 2008/0236394 | A1 | | 10/2008 | Ohno et al. |
| 2009/0028979 | A1 | * | 1/2009 | Asaoka ................. B23P 15/243 425/382 R |
| 2009/0028981 | A1 | * | 1/2009 | Asaoka ................... B28B 3/269 425/461 |
| 2009/0028982 | A1 | * | 1/2009 | Asaoka ................... B28B 3/269 425/464 |
| 2010/0209546 | A1 | * | 8/2010 | Hayashi ................. B28B 3/269 425/464 |
| 2010/0301514 | A1 | * | 12/2010 | Lehman ................. B28B 3/269 264/166 |
| 2011/0052745 | A1 | * | 3/2011 | Corbett ................. B23P 15/243 425/464 |
| 2011/0237427 | A1 | | 9/2011 | Saito et al. |
| 2013/0300016 | A1 | * | 11/2013 | Brew .................... B28B 3/2681 264/40.5 |
| 2013/0300023 | A1 | * | 11/2013 | Brew .................... B28B 3/2672 264/177.12 |

FOREIGN PATENT DOCUMENTS

| | | |
|---|---|---|
| JP | 63-144836 U | 9/1988 |
| JP | 3-275309 A | 12/1991 |
| JP | 2002-283327 A | 10/2002 |
| JP | 2004-001365 A | 1/2004 |
| JP | 2005-007218 A | 1/2005 |
| JP | 2008-155594 A | 7/2008 |
| JP | 2009-061683 A | 3/2009 |
| JP | 2012-170935 A | 9/2012 |
| WO | 2008/126335 A1 | 10/2008 |

OTHER PUBLICATIONS

Communication dated Jun. 6, 2018, from the European Patent Office in counterpart European Application No. 15846063.4.

Extended European Search Report dated Oct. 8, 2018, from the European Patent Office in counterpart European Application No. 15846063.4.

* cited by examiner

CERAMIC HONEYCOMB STRUCTURE AND ITS PRODUCTION METHOD, AND HONEYCOMB-MOLDING DIE

CROSS REFERENCE TO RELATED APPLICATIONS

This application is a National Stage of International Application No. PCT/JP2015/077878 filed Sep. 30, 2015 (claiming priority based on Japanese Patent Application No. 2014-201888, filed Sep. 30, 2014), the contents of which are incorporated herein by reference in their entirety.

FIELD OF THE INVENTION

The present invention relates to a ceramic honeycomb structure and its production method, and a die for molding a honeycomb green body.

BACKGROUND OF THE INVENTION

Ceramic honeycomb structures are used for catalyst carriers and filters in exhaust-gas-cleaning apparatuses for internal engines. As shown in FIG. 9, a ceramic honeycomb structure 60 comprises an outer peripheral wall 61 and pluralities of flow paths 63 partitioned by porous cell walls 62 inside the outer peripheral wall 61. Such ceramic honeycomb structure can be formed by extrusion-molding a plasticized moldable ceramic material by a known die to obtain a honeycomb green body, cutting it, and drying and sintering it.

In the case of large ceramic honeycomb structures of 190 mm or more in outer diameter and 203 mm or more in length, or those having as thin cell walls as less than 0.15 mm for catalyst carriers and filters for diesel engines, however, outer peripheral walls of the extrusion-molded green bodies may be deformed because of their own weight and insufficient strength, failing to obtain predetermined size precision and strength.

To solve this problem, JP 3-275309 A discloses a method of extrusion-molding a moldable ceramic material; drying and sintering it to form a honeycomb-structured sintered body; grinding the outermost and nearby cell walls of this honeycomb-structured sintered body to a smaller diameter than the predetermined diameter; coating the ground outer peripheral surface with a coating material; and drying and hardening it to form an outer peripheral wall. JP 3-275309 A describes that because this method removes the outermost and nearby cell walls of the honeycomb-structured sintered body by grinding to improve circularity, and then forms an outer peripheral wall, deformed flow paths in a peripheral portion can be removed, resulting in improved mechanical strength and size precision, even when the honeycomb-structured sintered body has poor circularity.

However, because the method of JP 3-275309 A removes the outermost and nearby cell walls of the honeycomb-structured sintered body by machining, flow paths made open by machining may suffer damages such as deformation, cracking, etc. in subsequent steps, as well as increased cost for removal. Accordingly, it is desired to provide a method capable of easily producing a honeycomb structure having high size precision.

JP 2008-155594 A discloses a method for producing a honeycomb structure comprising an outermost peripheral wall, and honeycomb-arranged cell walls inside the outermost peripheral wall for defining pluralities of longitudinal flow paths; comprising the steps of extrusion-molding a ceramic material obtained by blending at least material powder and water to form, as shown in FIGS. 10(a) and 10(b), a skinless honeycomb green body 50 having ends 55 of cell walls 52 exposed to a peripheral side without having an outermost peripheral cell wall; drying the skinless honeycomb green body; applying a coating material to a peripheral surface of the skinless honeycomb green body without machining the peripheral surface; and heat-treating the skinless honeycomb green body to obtain a honeycomb structure; the extrusion-molding step using a die comprising a die body having material-supplying holes, slits arranged in a polygonal lattice pattern in communication with the holes for molding the material to a honeycomb shape, and a guide ring abutting a surface having the slits for defining the outer diameter of the skinless honeycomb green body; the die body being provided with no holes or closed holes to prevent the intrusion of the material outside the minimum inner diameter of the guide ring; and the guide ring having an inner surface inclined in a range of 100°±5° to the surface having the slits. JP 2008-155594 A describes that this method can easily produce a honeycomb structure and a skinless honeycomb green body having high size precision.

However, when ceramic honeycomb structures are produced by the method described in JP 2008-155594 A, the inventor has found that this method suffers the following problems. As shown in FIGS. 10(a) and 10(b), a skinless honeycomb green body 50 formed by the die described in JP 2008-155594 A comprises pluralities of longitudinal grooves 56, with end portions 55 of cell walls 52 exposed to the peripheral side. It has thus been found that during handling in a skin-forming step of applying a coating material to the peripheral side of the extrusion-molded skinless honeycomb green body 50, cell walls 52 exposed to the peripheral side may be damaged. When the exposed cell walls 52 are damaged, its shock is transmitted to cell wall intersections, so that the cell wall intersections may be cracked. When a ceramic honeycomb body having cracks in cell wall intersections receives heat shock, cracks propagate from the cell wall intersections toward the inside of the ceramic honeycomb structure, likely providing the ceramic honeycomb structure with decreased heat shock resistance. It has been found that for example, when a large honeycomb structure of 150 mm in outer diameter and 150 mm or more in length having as high porosity as 50% or more is produced, the outermost flow paths are easily deformed, providing the ceramic honeycomb structure with decreased isostatic strength.

Japanese Utility Model Laid-Open No. 63-144836 discloses a ceramic honeycomb structure comprising a coating layer formed partially or entirely on an outer peripheral wall of a ceramic honeycomb structure having a smaller outer size than a predetermined one to make up for the difference between the predetermined outer size and an actual size. Japanese Utility Model Laid-Open No. 63-144836 describes that such a coating layer reinforces the outer peripheral wall and gives the predetermined outer size.

However, for example, when a large honeycomb structure of 150 mm in outer diameter and 150 mm or more in length having as high porosity as 50% or more is produced, the outermost flow paths are easily deformed to provide the ceramic honeycomb structure with low isostatic strength. Thus, sufficient improvement as described in Japanese Utility Model Laid-Open No. 63-144836 cannot be obtained only by the coating layer, needing further measures.

JP 2005-7218 A discloses a ceramic honeycomb structure comprising cell walls and an outer peripheral wall integral with the cell walls, at least part of the outer peripheral wall having longitudinally continuous pores, whose diameters are 0.1 mm or more in a cross section perpendicular to the axial direction of the ceramic honeycomb structure. JP 2005-7218 A describes that with such pores, even an outer peripheral wall made thicker to have enough strength has small heat capacity, resulting in improved thermal conductivity and thus improved heat shock resistance.

However, for example, when a large honeycomb structure of 150 mm in outer diameter and 150 mm or more in length having as high porosity as 50% or more is produced, the outermost flow paths are easily deformed, providing the ceramic honeycomb structure with decreased isostatic strength. It has thus been found that sufficient improvement cannot be obtained by the method described in JP 2005-7218 A.

JP 2009-61683 A discloses a honeycomb-structure-molding die comprising a die body comprising a member having supply holes for supplying a material, and a member having slit grooves in a lattice shape communicating with the supply holes for molding the material to a honeycomb shape; a guide member extending from an outer periphery of the member having slit grooves toward the extrusion direction of the material; and a guide ring having a guide projection extending inward from the guide member for providing a gap with the member having slit grooves; the member having slit grooves having a step portion extending toward the extrusion direction of the material in a portion not facing the guide projection; the relations of (c−a)/b>1 and a/b>1 being met among a spacer thickness "a" corresponding to the thickness of the gap between the member having slit grooves and the guide projection, a clearance "b" between a peripheral side of the step portion and a tip end of the guide projection, and a step height "c" in the member having slit grooves; and an angle θ between a peripheral side of the step portion and a slit-groove-forming surface of the step portion in the member having slit grooves meeting 900°≤θ≤130°.

In the honeycomb-structure-molding die described in JP 2009-61683 A, however, because the guide ring forming the outer peripheral wall has a circular shape when viewed in an axial direction, flow paths partitioned by square-lattice-cross-sectioned cell walls are not complete square, but an incomplete triangular or pentagonal shape partially partitioned by an circular outer peripheral wall, in an outermost peripheral portion of the honeycomb structure. It has thus been found that particularly when a large honeycomb structure of 150 mm in outer diameter and 150 mm or more in length having as high porosity as 50% or more is produced, flow paths are easily deformed near such incomplete flow paths, resulting in a ceramic honeycomb structure having isostatic strength decreased by the deformation of such outermost flow paths.

Object of the Invention

Accordingly, an object of the present invention is to provide a ceramic honeycomb structure comprising an integrally extrusion-molded outer peripheral wall, needing no machining on an outer peripheral surface of an extrusion-molded honeycomb green body, the extrusion-molded ceramic honeycomb green body being resistant to damage on the outer peripheral surface during handling, resulting in less propagation of cracks inside the ceramic honeycomb structure, and the ceramic honeycomb structure being resistant to decrease in heat shock resistance and having little deformation in the extrusion-molded outermost flow paths, thereby having sufficient isostatic strength; and its production method; and a die for molding a honeycomb green body.

SUMMARY OF THE INVENTION

As a result of intensive research in view of the above object, the inventor has found that by integrally forming by extrusion molding square-lattice-cross-sectioned cell walls defining pluralities of longitudinal flow paths, and an outer peripheral cell wall having an outer peripheral surface shape reflecting the square lattice shapes of the cell walls and thicker than the cell walls, a ceramic honeycomb green body needing no machining on the outer peripheral surface, resistant to damage on the outer peripheral surface during handling, and little deformation in the outermost flow paths can be obtained. The present invention has been completed based on such findings.

Thus, the ceramic honeycomb structure of the present invention comprises a ceramic honeycomb body having pluralities of longitudinal flow paths partitioned by square-lattice-cross-sectioned cell walls, and an outer peripheral wall formed on an outer periphery of the ceramic honeycomb body;

the outermost peripheral cell wall of the ceramic honeycomb body having an outer peripheral surface shape reflecting the square lattice shapes of the cell walls;

the minimum thickness of the outer peripheral cell wall being larger than the thickness of the cell walls; and the outer peripheral wall being formed to cover the outer peripheral cell wall.

A ratio T/t of the minimum thickness T of the outer peripheral cell wall to the thickness t of the cell walls preferably meets 1<T/t≤10.

The degree of flow path deformation $D_1/D_0$ in an axially viewed cross section is preferably 0.9-1.1, wherein $D_1$ represents a diameter of the largest circle inscribed in the outermost flow path cell wall, and $D_0$ represents a diameter of the largest circle inscribed in an undeformed ideal flow path cell wall.

The method of the present invention for producing a ceramic honeycomb structure comprising a ceramic honeycomb body having pluralities of longitudinal flow paths partitioned by square-lattice-cross-sectioned cell walls, and an outer peripheral wall formed on an outer periphery of the ceramic honeycomb body; comprises the steps of extrusion-molding a moldable ceramic material to form a ceramic honeycomb green body integrally comprising square-lattice-cross-sectioned cell walls defining pluralities of longitudinal flow paths, and an outermost peripheral cell wall having an outer peripheral surface shape reflecting the square lattice shapes of the cell walls for constituting an outermost periphery of the ceramic honeycomb body;

drying and sintering the ceramic honeycomb green body to obtain the ceramic honeycomb body; and applying a coating material to an outer peripheral surface of the outer peripheral cell wall of the ceramic honeycomb body, and heat-treating the coating material to form the outer peripheral wall;

a die used in the extrusion-molding step comprising a die body comprising supply holes for supplying the moldable ceramic material, and square-lattice-patterned slits formed on the opposite surface side to a surface apertured for having the supply holes, such that they are communicating with the supply holes to extrusion-mold the moldable ceramic material supplied through the supply holes to a honeycomb shape, and a guide ring arranged on the slit-grooved surface side for regulating an outer peripheral surface shape of the outer peripheral cell wall of the ceramic honeycomb green body;

the grooved surface having a cell-walls-forming region for forming the square-lattice-shaped cell walls, and an outer peripheral region positioned outside the cell-walls-forming region via a step H, such that the cell-walls-forming region constitutes an elevated surface;

the cell-walls-forming region having an outer peripheral shape reflecting the square lattice shapes of the slits;

the guide ring surrounding the cell-walls-forming region such that it has an inner peripheral shape along an outer peripheral shape of the cell-walls-forming region, with a gap smaller than the step H disposed between the guide ring and the grooved surface in the outer peripheral region to supply the moldable ceramic material for forming the outer peripheral cell wall.

A ratio T/t of the minimum thickness T of the outer peripheral cell wall to the thickness t of the cell walls preferably meets $1<T/t\le 10$.

The coating material preferably comprises ceramic aggregate particles and an inorganic binder as main components.

The ceramic aggregate particles are preferably made of at least one selected from the group consisting of cordierite, silica, alumina, mullite, silicon carbide, silicon nitride and aluminum titanate.

The die of the present invention for forming by extrusion molding a ceramic honeycomb green body having pluralities of longitudinal flow paths partitioned by square-lattice-cross-sectioned cell walls, comprises a die body comprising supply holes for supplying a moldable material, and square-lattice-patterned slits formed on the opposite surface side to a surface apertured for having the supply holes, such that they are communicating with the supply holes to mold the moldable material to a honeycomb shape; and a guide ring arranged on the slit-grooved surface side for regulating an outer peripheral surface shape of the outermost peripheral cell wall of the honeycomb green body;

the grooved surface having a cell-walls-forming region for forming the square-lattice-cross-sectioned cell walls, and an outer peripheral region positioned outside the cell-walls-forming region via a step H, such that the cell-walls-forming region constitutes an elevated surface;

the cell-walls-forming region having an outer peripheral shape reflecting the square lattice shapes of the slits; and the guide ring surrounding the cell-walls-forming region such that it has an inner peripheral shape along an outer peripheral shape of the cell-walls-forming region, with a gap smaller than the step H disposed between the guide ring and the grooved surface in the outer peripheral region to supply a moldable material for forming the outer peripheral cell wall.

The relation of $ts<d\le(s+ts)$ is preferably met in a direction perpendicular to the square-lattice-shaped slits, wherein "d" represents the smallest gap between an inner peripheral surface of the guide ring and an outermost periphery of the cell-walls-forming region, "s" represents an interval between adjacent square-lattice-shaped slits, and "ts" represents a slit width.

An angle θ between the inner peripheral surface of the guide ring and the grooved surface preferably meets the relation of $300\le\theta<90°$.

Effects of the Invention

The method of the present invention can form an outer peripheral wall without machining an outer peripheral surface of an extrusion-molded honeycomb green body, with less damage in outer peripheral cell walls and less deformation in outermost flow paths while handling the extrusion-molded ceramic honeycomb green body, thereby providing a ceramic honeycomb structure with sufficient isostatic strength.

Extrusion-molding by the honeycomb-molding die of the present invention integrally forms square-lattice-cross-sectioned cell walls defining pluralities of longitudinal flow paths, and an outer peripheral cell wall having an outer peripheral surface shape reflecting the square lattice shapes of the cell walls and thicker than the cell walls, with less deformation in the outermost flow paths.

DESCRIPTION OF THE PREFERRED EMBODIMENTS

The embodiments of the present invention will be specifically explained below without intention of restricting the present invention thereto. It should be noted that proper modifications and improvements can be made based on the usual knowledge of those skilled in the art within the scope of the present invention.

[1] Ceramic Honeycomb Structure

Figure 1A:
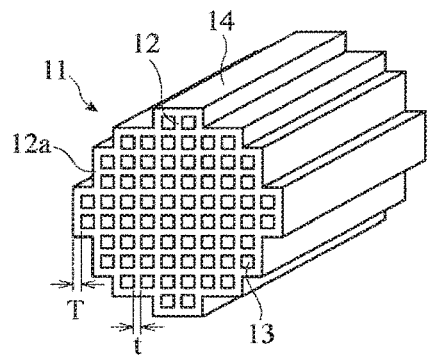
FIG. 1(a) is a schematic view showing an example of ceramic honeycomb bodies.
Figure 1B:
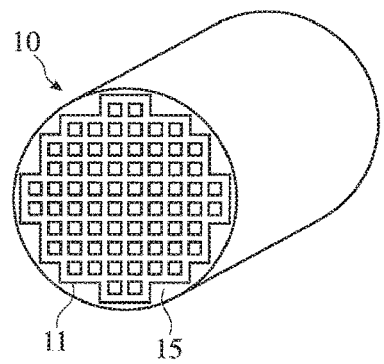
FIG. 1(b) is a schematic view showing an example of the ceramic honeycomb structures of the present invention.

As shown in FIGS. 1(a) and 1(b), the ceramic honeycomb structure 10 of the present invention comprises a ceramic honeycomb body 11 having pluralities of longitudinal flow paths 13 partitioned by square-lattice-cross-sectioned cell walls 12 [FIG. 1(a)], and an outer peripheral wall 15 formed around an outer periphery of the ceramic honeycomb body 11; the outermost peripheral cell wall 12a of the ceramic honeycomb body 11 being in a shape of an outer peripheral surface 14 reflecting the square lattice shapes of the cell walls 12; and the outer peripheral wall 15 covering the not-machined outer peripheral surface 14 of the outer peripheral cell wall 12a of the ceramic honeycomb body 11. The outer peripheral surface shape reflecting the square lattice shapes of cell walls means an outer peripheral surface shape constituted by one or two outward exposed cell walls (outer peripheral cell wall 12a) among four cell walls constituting square flow paths in the outermost periphery. The outer peripheral cell wall 12a in a shape of the outer peripheral surface 14 reflecting the square lattice shapes of cell walls 12 is constituted by outermost cell walls of the square-lattice-cross-sectioned cell walls 12, which is thicker than the other cell walls 12. The outer peripheral surface 14 of the outer peripheral cell wall 12a preferably has such a shape in a transverse cross section as to provide the minimum diameter difference between the largest circle inscribed in the outer peripheral surface 14 and the smallest circle circumscribed on the outer peripheral surface 14.

Figure 10A:
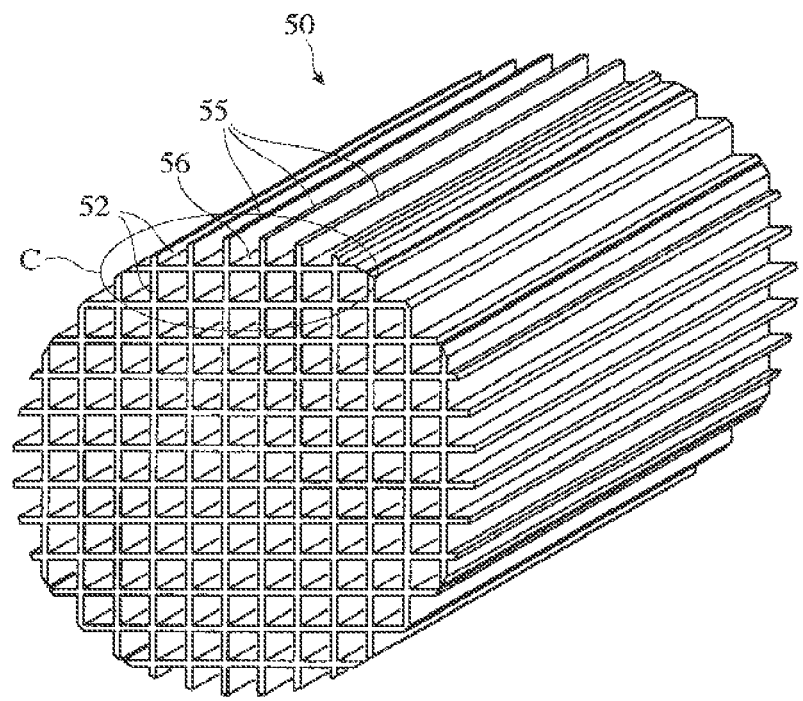
FIG. 10(a) is a schematic view showing a skinless honeycomb structure described in JP 2008-155594 A.
Figure 10B:
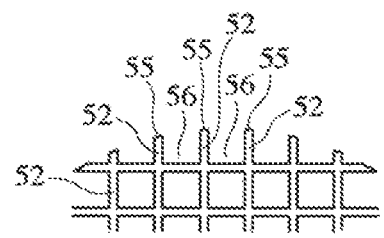
FIG. 10(b) is an enlarged schematic cross-sectional view showing a portion C in FIG. 10(a).

With the outer peripheral cell wall 12a of the ceramic honeycomb body 11 in a shape of the outer peripheral surface 14 reflecting the square-lattice-cross-sectioned cell walls 12, as shown in FIG. 1(a), all cell walls 12 constituting the ceramic honeycomb body 11 including the outermost peripheral cell wall 12a are in a complete lattice shape, without incomplete cell walls 52 having outward exposed end portions 55 as shown in FIGS. 10(a) and 10(b). As a result, in drying and sintering the extrusion-molded ceramic honeycomb green body 11, and in handling the dried and sintered ceramic honeycomb body 11 to form an outer peripheral wall 15 on the outer peripheral surface 14, the outer peripheral surface 14 of the ceramic honeycomb green body 11 is less damaged, resistant to the propagation of cracks inside the ceramic honeycomb structure, and thus resistant to decrease in heat shock resistance. Further, the ceramic honeycomb structure of the present invention 10 has sufficient isostatic strength because of less deformation in the outermost flow paths.

Figure 2A:
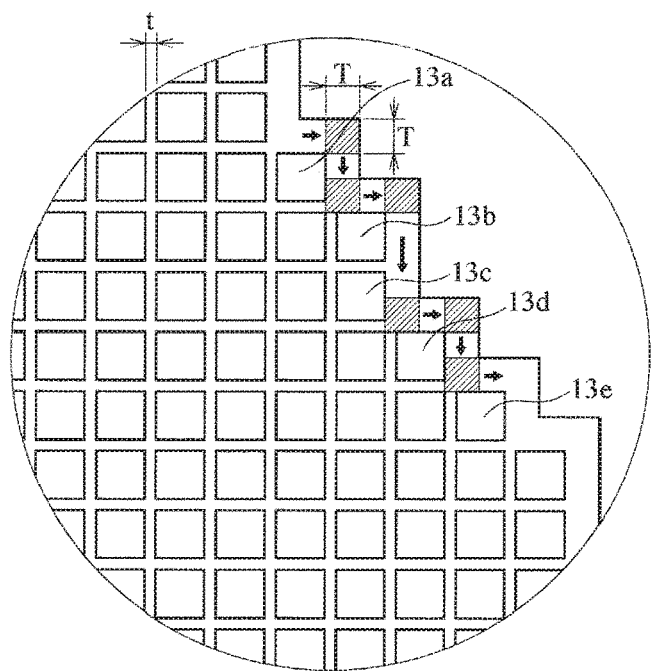
FIG. 2(a) is a partial cross-sectional view showing an outer peripheral cell wall of the ceramic honeycomb structure of the present invention.

The minimum thickness T of the outer peripheral cell wall 12a of the ceramic honeycomb body 11 is larger than the thickness t of the cell walls 12 not existing in the outermost periphery, namely T>t. The minimum thickness T of the outer peripheral cell wall 12a is the minimum of the thicknesses of the outer peripheral cell wall 12a measured in arbitrary directions perpendicular to the cell walls 12. In practice, each of arbitrary flow paths (for example, 20 flow paths) positioned in the outermost periphery is measured with respect to thickness in one or two sides of its outer peripheral cell wall 12a, and the minimum thickness is regarded as T. As shown in FIG. 2(a), an outer peripheral cell wall 12a having the minimum thickness T is preferably expressed by a locus of a square of T in each side smoothly moving with its one side partially or entirely in contact with the outermost peripheral surface without rotation. FIG. 2(a) shows the locus on five arbitrary continuous flow paths (flow paths 13a to 13e) in the outermost periphery.

Figure 2B:
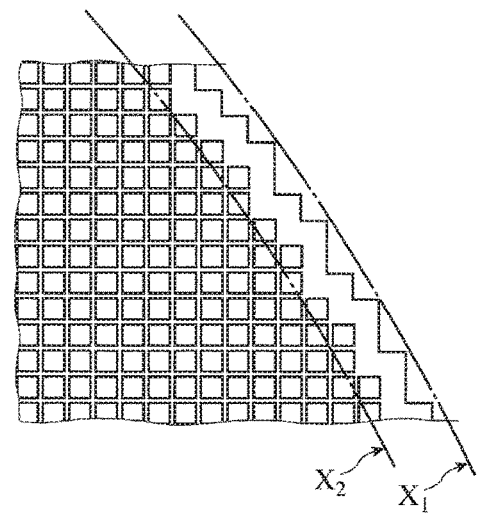
FIG. 2(b) is a partial cross-sectional view showing an outer peripheral cell wall of the ceramic honeycomb structure of the present invention.
Figure 3A:
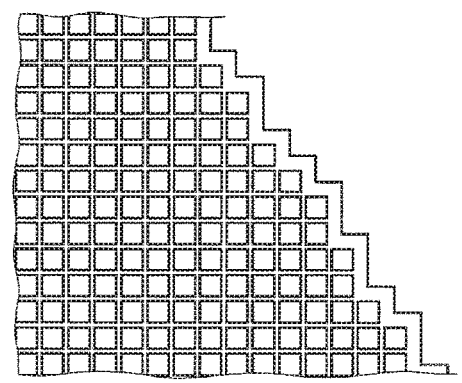
FIG. 3(a) is a partial cross-sectional view schematically showing an example of ceramic honeycomb bodies.
Figure 3B:
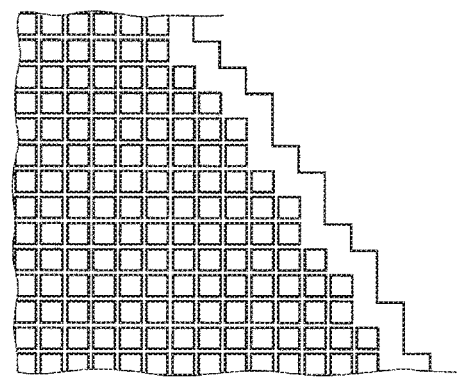
FIG. 3(b) is a partial cross-sectional view schematically showing another example of ceramic honeycomb bodies.
Figure 3C:
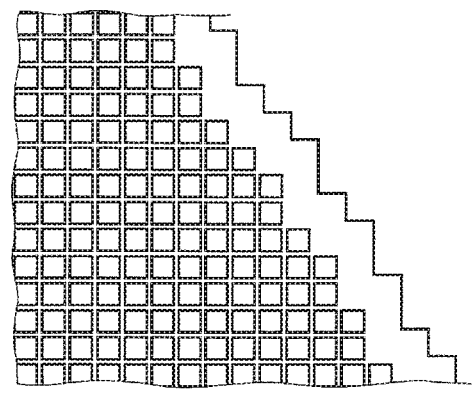
FIG. 3(c) is a partial cross-sectional view schematically showing a further example of ceramic honeycomb bodies.
Figure 3D:
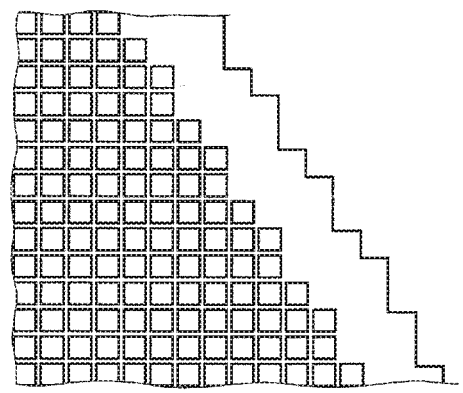
FIG. 3(d) is a partial cross-sectional view schematically showing a still further example of ceramic honeycomb bodies.

As shown in FIG. 2(b), the outer peripheral cell wall preferably exists completely between a circle of the minimum diameter $X_1$ circumscribed on the outer peripheral cell wall and a circle of a diameter $X_2$ inside the above circle, $X_2 < X_1$. When a circle of the diameter $X_2$ is the largest circle inscribed in the outer peripheral cell wall, the outer peripheral cell wall is preferably shaped to provide the minimum difference between the diameter $X_1$ of the smallest circle circumscribed on the outer peripheral cell wall and the diameter $X_2$ of the largest circle inscribed in the outer peripheral cell wall. The diameters $X_1$ and $X_2$ meet preferably $0.9 \le X_2/X_1$, more preferably $0.93 \le X_2/X_1$, most preferably $0.95 \le X_2/X_1$. Incidentally, $X_1$ represents the diameter of the honeycomb body.

With the minimum thickness T of the outer peripheral cell wall 12a larger than the thickness t of cell walls 12 not existing in the outermost periphery, cell walls in the outer peripheral surface 14 of the ceramic honeycomb green body 11 (outer peripheral cell wall 12a) are less damaged in handling the ceramic honeycomb green body 11. The minimum thickness T of the outer peripheral cell wall 12a is preferably 10 times or less of the cell wall thickness t, a ratio T/t meeting $1 < T/t \le 10$. The ratio T/t meets more preferably $1.5 < T/t \le 7$, further preferably $1.5 < T/t \le 5$. The cross sections of ceramic honeycomb green bodies 11, in which the minimum thickness T of the outer peripheral cell wall 12a meets T=3t, T=5t, T=7t, and T=10t, respectively, are schematically shown in FIGS. 3(a), 3(b), 3(c) and 3(d).

Figure 4A:
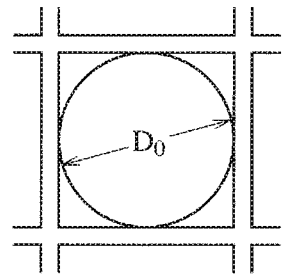
FIG. 4(a) is a schematic cross-sectional view showing the largest circle inscribed in an undeformed ideal flow path.
Figure 4B:
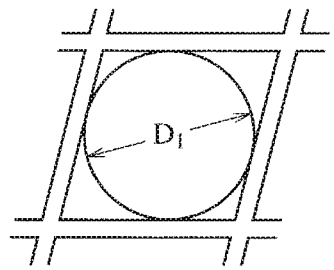
FIG. 4(b) is a schematic cross-sectional view showing an example of the largest circle inscribed in a deformed flow path.
Figure 4C:
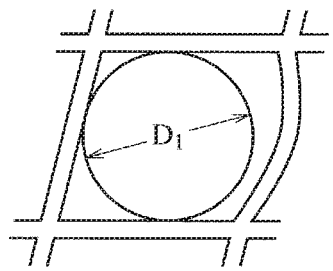
FIG. 4(c) is a schematic cross-sectional view showing another example of the largest circle inscribed in a deformed flow path.
Figure 4D:
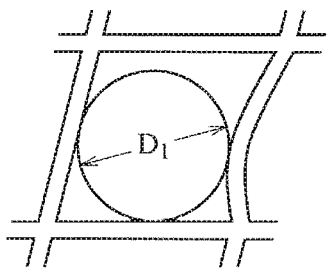
FIG. 4(d) is a schematic cross-sectional view showing a further example of the largest circle inscribed in a deformed flow path.

As shown in FIGS. 4(a) to 4(d), the degree of deformation of a flow path is evaluated by a diameter of the largest circle inscribed in at least two cell walls among four cell walls of the flow path, which may be called "the largest inscribed circle," in a cross section perpendicular to the axis of the ceramic honeycomb structure. Namely, the degree of deformation of a flow path is expressed by $D_1/D_0$, wherein $D_0$ represents a diameter (designed value) of the largest circle inscribed in an undeformed ideal flow path, and $D_1$ represents a diameter of the largest circle inscribed in an arbitrary flow path. For example, a flow path may be rhombically deformed as shown in FIG. 4(b) from an ideal square flow path [FIG. 4(a)] without the deformation of cell walls, or a cell wall may be further deformed as shown in FIGS. 4(c) and 4(d). In the present invention, the degree of flow path deformation $D_1/D_0$ in the outermost flow paths is preferably in a range of 0.9-1.1, more preferably in a range of 0.92-1.08. The degree of flow path deformation $D_1/D_0$ in the outermost flow paths is expressed by an average of values measured on arbitrarily selected 20 outermost flow paths (flow paths in the outermost periphery).

Figure 5A:
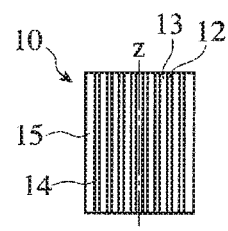
FIG. 5(a) is a schematic view showing an example of flow-path-direction cross sections of the ceramic honeycomb structure of the present invention.
Figure 5B:
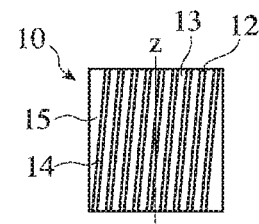
FIG. 5(b) is a schematic view showing another example of flow-path-direction cross sections of the ceramic honeycomb structure of the present invention.
Figure 5C:
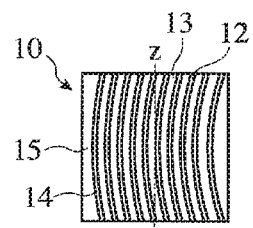
FIG. 5(c) is a schematic view showing a further example of flow-path-direction cross sections of the ceramic honeycomb structure of the present invention.
Figure 5D:
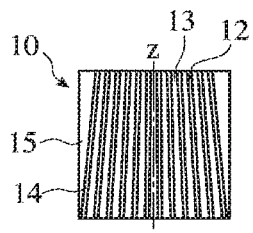
FIG. 5(d) is a schematic view showing a still further example of flow-path-direction cross sections of the ceramic honeycomb structure of the present invention.

In the ceramic honeycomb structure 10 of the present invention, the flow paths 13 after forming the outer peripheral wall 15 may be substantially parallel to the center axis z of the ceramic honeycomb structure 10 as shown in FIG. 5(a), or may be inclined from the center axis z of the ceramic honeycomb structure as shown in FIG. 5(b). Further, the flow paths may be curved as shown in FIG. 5(c), or may have increasing cross section areas as shown in FIG. 5(d).

[2] Production Method of Ceramic Honeycomb Structure

The method of the present invention for producing a ceramic honeycomb structure comprising a ceramic honeycomb body having pluralities of longitudinal flow paths partitioned by square-lattice-cross-sectioned cell walls, and an outer peripheral wall formed on an outer periphery of the ceramic honeycomb body, comprises the steps of (a) extrusion-molding a moldable ceramic material to form a ceramic honeycomb green body integrally comprising square-lattice-cross-sectioned cell walls defining pluralities of longitudinal flow paths, and an outermost peripheral cell wall having an outer peripheral surface shape reflecting the square lattice shapes of the cell walls for constituting the outermost periphery of a ceramic honeycomb body;

(b) drying and sintering the ceramic honeycomb green body to obtain the ceramic honeycomb body; and (c) applying a coating material to an outer peripheral surface of the outermost peripheral cell wall of the ceramic honeycomb body, and heat-treating the coating material, to form an outer peripheral wall;

a die used in the extrusion-molding step comprising (1) a die body comprising supply holes for supplying the moldable ceramic material, and square-lattice-patterned slits formed on the opposite surface side to a surface apertured for having the supply holes, such that they are communicating with the supply holes to extrusion-mold the moldable ceramic material supplied through the supply holes to a honeycomb shape, and (2) a guide ring arranged on the slit-grooved surface side for regulating an outer peripheral surface shape of the outer peripheral cell wall of the ceramic honeycomb green body;

the grooved surface having a cell-walls-forming region for forming the square-lattice-shaped cell walls, and an outer peripheral region positioned outside the cell-walls-forming region via a step H, such that the cell-walls-forming region constitutes an elevated surface;

the cell-walls-forming region having an outer peripheral shape reflecting the square lattice shapes of the slits; and the guide ring surrounding the cell-walls-forming region such that it has an inner peripheral shape along the outer peripheral shape of the cell-walls-forming region, with a gap smaller than the step H disposed between the guide ring and the grooved surface in the outer peripheral region to supply the moldable ceramic material for forming the outer peripheral cell wall.

A ceramic honeycomb green body formed by a moldable ceramic material extrusion-molded by the above die integrally comprises square-lattice-cross-sectioned cell walls defining pluralities of longitudinal flow paths, and an outer peripheral cell wall having an outer peripheral surface shape reflecting the square lattice shapes of the cell walls and thicker than the cell walls, with few deformed flow paths near the outer periphery and no incomplete flow paths not in a square lattice shape, so that cell walls on the outer peripheral surface of the ceramic honeycomb green body are resistant to damage while handling the extrusion-molded ceramic honeycomb green body. A ceramic honeycomb body obtained by drying and sintering the ceramic honeycomb green body can be provided with an outer peripheral wall on an outer peripheral surface of the not-machined outer peripheral cell wall. Because of no deformed flow paths near the outer periphery, a ceramic honeycomb structure having high isostatic strength can be obtained.

(1) Coating Material

The coating material preferably comprises ceramic aggregate particles and an inorganic binder as main components. The coating material comprises ceramic aggregate particles as aggregate, and an inorganic binder for bonding the aggregate. With the coating material comprising ceramic aggregate particles and an inorganic binder as main components, the outer peripheral wall is well bonded to the outer peripheral surface of the ceramic honeycomb body after coating and heat-treating without machining, resulting in a ceramic honeycomb structure having good heat shock resistance with less cracking inside the ceramic honeycomb body. The inorganic binder may be colloidal oxides such as colloidal silica, colloidal alumina, etc. The coating material may contain ceramic fibers.

Because the ceramic honeycomb structure of the present invention is used in an exhaust-gas-cleaning apparatus, the ceramic aggregate particles are preferably at least one selected from cordierite, silica, alumina, mullite, silicon carbide, silicon nitride and aluminum titanate having good heat resistance. Among them, the use of cordierite and/or amorphous silica reduces the thermal expansion coefficient of the outer peripheral wall, resulting in higher heat shock resistance.

(2) Honeycomb-Molding Die

As shown in FIGS. 6(a) to 6(d), a die 30 comprises supply holes 31 open on an apertured surface 31a for supplying a moldable material (for example, moldable ceramic material), and square-lattice-patterned slits 32 open on grooved surfaces 32a, 32b opposite to the apertured surface 31a having the supply holes 31, such that slits 32 are communicating with the supply holes 31. The grooved surface 32a is in a cell-walls-forming region 33a for forming square-lattice-cross-sectioned cell walls of the honeycomb green body, and the grooved surface 32b is in an outer peripheral region 33b outside the cell-walls-forming region 33a. The cell-walls-forming region 33a has an outer peripheral shape reflecting the square lattice shapes of the slits 32. The grooved surface 32b in the outer peripheral region 33b is connected to the grooved surface 32a in the cell-walls-forming region 33a via a step H, such that the grooved surface 32a constitutes an elevated surface. Namely, the step H is provided in a boundary between the cell-walls-forming region 33a and the outer peripheral region 33b. The step H is formed by using slits 32c defining the outer peripheral wall of the honeycomb green body. Namely, the outermost periphery 33c of the cell-walls-forming region 33a is in accordance with inside surfaces of the slits 32c (on the center side of the die) defining the outer peripheral cell walls. The outer peripheral shape of the cell-walls-forming region 33a in an axially viewed cross section is preferably designed to provide the minimum diameter difference between the largest circle inscribed in the outer peripheral shape and the smallest circle circumscribed on the outer peripheral shape.

The guide ring 35 for regulating a shape of the outer peripheral surface 14 of the outer peripheral cell wall 12a of the honeycomb green body 11 is arranged on the grooved surface 32b in the outer peripheral region 33b, such that it encloses the outermost periphery 33c of the cell-walls-forming region 33a. The guide ring 35 comprises a surface 35b in contact with the grooved surface 32b, and a non-contact surface 35p providing a clearance L with the grooved surface 32b, the clearance L being smaller than the step H between the grooved surface 32a and the grooved surface 32b (L<H). The inner peripheral surface 35a of the guide ring 35 has a shape along the outer peripheral shape of the cell-walls-forming region 33a, when viewed from the extrusion direction. The cell-walls-forming region 33a and the guide ring 35 are selected to determine the outer diameter of the honeycomb body for the desired diameter of the honeycomb structure, taking into consideration the thickness of the outer peripheral wall.

Figure 7A:
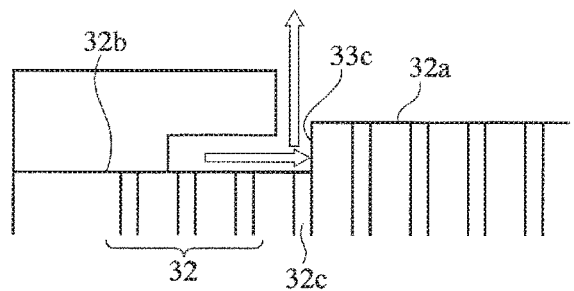
FIG. 7(a) is a schematic cross-sectional view showing the flow of a moldable material in the ceramic honeycomb-molding die of the present invention.
Figure 7B:
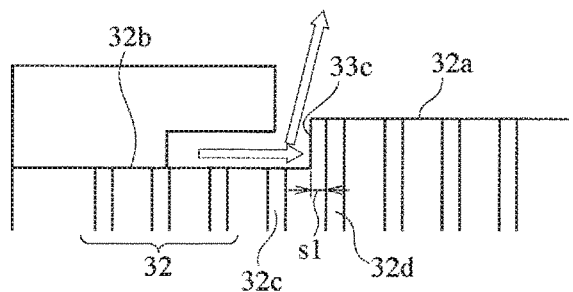
FIG. 7(b) is a schematic cross-sectional view showing the flow of a moldable material in a conventional ceramic honeycomb-molding die.

With the die of the present invention having such a structure (the slits 32c is located at the position of the step H, and the clearance L of the guide ring 35 is smaller than the step H), a moldable material discharged from the slit 32 of the grooved surface 32b receives only a force in the extrusion direction, when the flow direction of the moldable material changes to the extrusion direction (axial direction) at the outermost periphery 33c of the cell-walls-forming region 32a (at the step H) as shown in FIG. 7(a), so that the outermost flow paths of the ceramic honeycomb green body are unlikely deformed. On the other hand, when the guide ring does not have an inner peripheral shape along the outer peripheral surface shape of the outer peripheral cell wall of the ceramic honeycomb green body (for example, circular shape) as in the die described in JP 2009-61683 A, there are regions without the slits 32c at the step H, for example, as shown in FIG. 7(b), resulting in a small gap s1 between the outermost periphery 33c and the adjacent slit 32d. As a result, a moldable material for forming the outer peripheral cell wall receives a force toward a center of the honeycomb green body, so that the outermost flow paths are likely deformed.

Figure 8A:
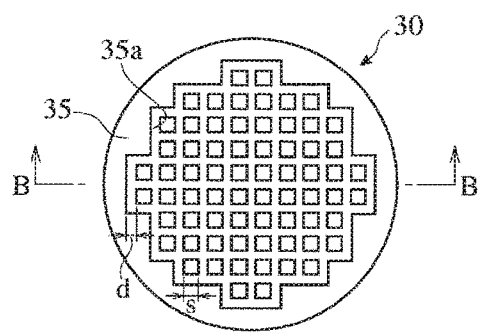
FIG. 8(a) is a front view showing another example of the ceramic honeycomb-molding dies of the present invention.
Figure 8B:
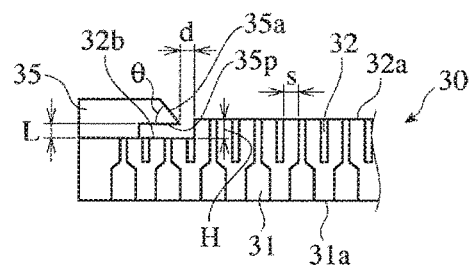
FIG. 8(b) is an enlarged schematic cross-sectional view taken along the line B-B in FIG. 8(a).
Figure 9:
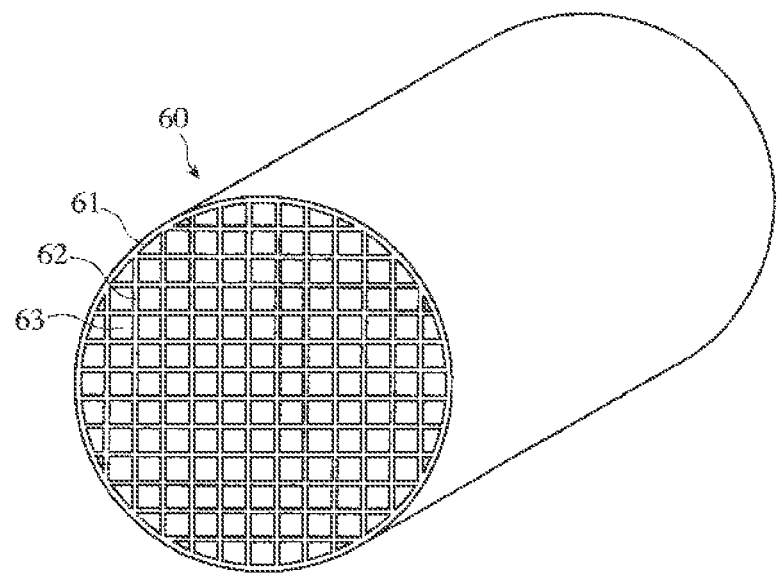
FIG. 9 is a schematic view showing an example of conventional ceramic honeycomb structures.

An angle θ between the inner peripheral surface 35a of the guide ring and the non-contact surface 35p (or the grooved surface 32b in the outer peripheral region 33b) is preferably less than 90°, more preferably 30 20 ≤θ<90°, as shown in FIGS. 8(a) and 8(b). When 0 is less than 30°, the guide ring 35 has such low strength that it may be undesirably deformed by the pressure of a moldable material discharged from the grooved surface 32b, resulting in the deformation of the outer peripheral wall and the outermost flow paths.

A moldable ceramic material extrusion-molded, for example, by such die can suitably provide a ceramic honeycomb green body integrally comprising square-lattice-cross-sectioned cell walls defining pluralities of longitudinal flow paths, and an outer peripheral wall having an outer peripheral surface shape reflecting the square lattice shapes of the cell walls and thicker than the cell walls as shown in FIG. 1(a). Cell walls in the outer peripheral surface of the ceramic honeycomb green body are unlikely damaged during handling, and the outermost flow paths are unlikely deformed during extrusion molding. With an outer peripheral wall formed by a coating material applied to an outer peripheral surface of the outer peripheral cell wall, a ceramic honeycomb structure having high isostatic strength can be obtained.

To produce such a honeycomb green body suitably, a ratio L/H of the clearance L between the non-contact surface 35p and the grooved surface 32b to the step H between the grooved surface 32a and the grooved surface 32b preferably meets 0.1≤L/H≤0.9. When the ratio L/H of the clearance L to the height of the step H is less than 0.1, a moldable material cannot be discharged from the grooved surface 32b easily, making it difficult to form the outer peripheral cell wall. On the other hand, when the ratio L/H is more than 0.9, a moldable material discharged from the grooved surface 32b receives a force toward a center of the honeycomb green body, so that the outer peripheral cell wall and the outermost flow paths are easily deformed. 0.2≤L/H≤0.8 is preferably met.

In the die used in the present invention, the smallest gap d between the inner peripheral surface 35a of the guide ring 35 and the outermost periphery 33c of the cell-walls-forming region 32a should be larger than the slit width ts, and is preferably equal to or less than the sum (s+ts) of the interval s of adjacent slits and the slit width ts. Namely, the smallest gap d, the interval s between adjacent slits, and the slit width ts preferably meet the relation of ts<d≤(s+ts). A sum of the interval s and the slit width ts corresponds to a slit pitch. When the smallest gap d is larger than (s+ts), a moldable ceramic material supplied for forming the outer peripheral wall is not directed to the outer peripheral region 33b, so that the outer peripheral wall may not be formed well. With d≤(s+ts) met, a honeycomb green body integrally comprising square-lattice-cross-sectioned cell walls defining pluralities of longitudinal flow paths, and an outermost peripheral cell wall having an outer peripheral surface shape reflecting the square lattice shapes of the cell walls and thicker than the cell walls for constituting the outermost flow paths can be suitably obtained.

Further, (Lp+d) is preferably equal to or more than (s+2ts), wherein Lp represents the length of the non-contact surface 35p of the guide ring 35 from the inner peripheral surface 35a. When (Lp+d) is (s+2ts) or more, a moldable ceramic material supplied through two or more slits [three slits in the die shown in FIGS. 6(c) and 8(b)] in the outer peripheral region 33b is extruded from the smallest gap d to form the outer peripheral wall. The length Lp is determined such that the range of (Lp+d) includes preferably 2-15 slits, more preferably 3-12 slits, most preferably 4-10 slits, in the outer peripheral region 33b.

The present invention will be explained in more detail by Examples below without intention of restriction.

Examples 1-3 and Comparative Example 1

Kaolin powder, talc powder, silica powder and alumina powder were mixed to have a cordierite composition comprising 50% by mass of $SiO_2$, 36% by mass of $Al_2O_3$ and 14% by mass of MgO, and fully dry-mixed with methylcellulose or hydroxypropyl methylcellulose as a binder, a lubricant, and a balloon-type foamed resin as a pore-forming material, and then sufficiently blended with a predetermined amount of water to prepare a plasticized moldable ceramic material.

Figure 6A:
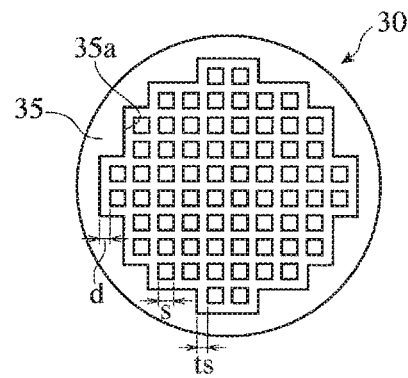
FIG. 6(a) is a front view showing an example of the ceramic honeycomb-molding dies of the present invention when viewed from the slit side.
Figure 6B:
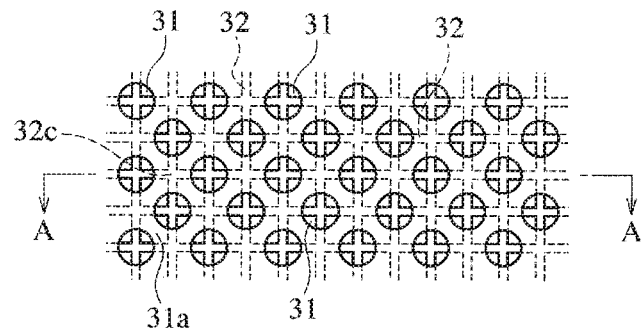
FIG. 6(b) is an enlarged front view showing an example of the ceramic honeycomb-molding dies of the present invention when viewed from the supply hole side.
Figure 6C:
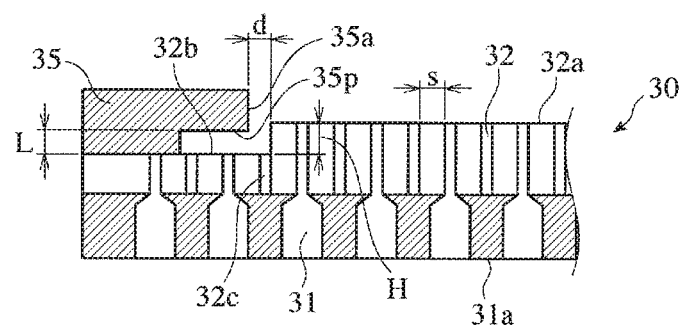
FIG. 6(c) is a schematic cross-sectional view taken along the line A-A in FIG. 6(b).
Figure 6D:
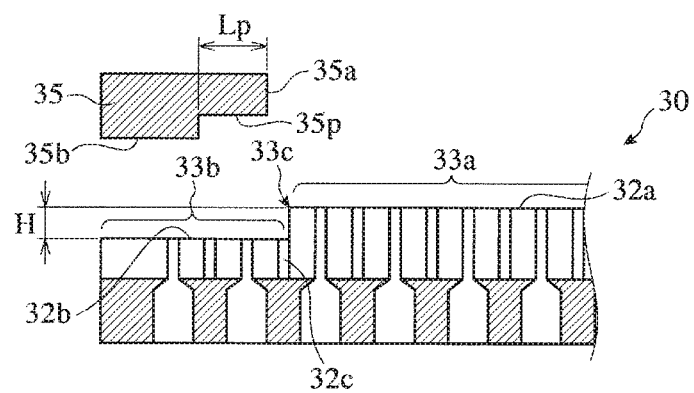
FIG. 6(d) is an exploded view of FIG. 6(c).
Figure 11:
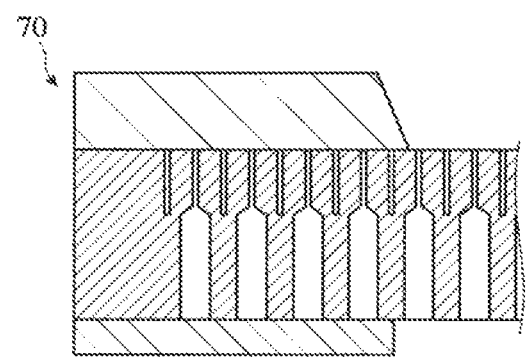
FIG. 11 is a schematic view showing the die described in JP 2008-155594 A.

This moldable ceramic material was extrusion-molded by the die 30 shown in FIGS. 6(a) to 6(c) in Examples 1-3, and by the die shown in FIG. 11 (described in JP 2008-155594 A) in Comparative Example 1. The structure of each die is shown in Table 1. "L" represents a clearance between the non-contact surface 35p of the guide ring 35 and the grooved surface 32b; "H" represents a step height between the grooved surface 32a and the grooved surface 32b; "d" represents the smallest gap between the inner peripheral surface 35a of the guide ring 35 and the outermost periphery 33c of the cell-walls-forming region 33a; "s" represents an interval between the adjacent slits 32, 32; "ts" represents a slit width; and "n" represents the number of slits in a range of (Lp+d) [see FIGS. 6(a) to 6(c)], namely the number of slits supplying a moldable ceramic material, which was extruded from the smallest gap d to form the outer peripheral wall.

TABLE 1

| No. | Inner Surface Shape of Guide Ring | L (mm) | H (mm) | d (mm) | s (mm) | n[1] | d/s | ts (mm) | θ (°) |
|---|---|---|---|---|---|---|---|---|---|
| Example 1 | Lattice Shape[2] | 1.5 | 3 | 0.2 | 1.47 | 5 | 0.14 | 0.14 | 90 |
| Example 2 | Lattice Shape[2] | 1.5 | 3 | 0.5 | 1.47 | 5 | 0.34 | 0.14 | 90 |
| Example 3 | Lattice Shape[2] | 1.5 | 3 | 0.7 | 1.47 | 5 | 0.48 | 0.14 | 60 |
| Com. Ex. 1 | Circular | — | — | — | 1.47 | — | — | 0.14 | 90 |

Note:
[1] The number of slits supplying a moldable ceramic material to form the outer peripheral cell wall.
[2] A shape reflecting the lattice shapes of cell walls.

The moldable ceramic material was extrusion-molded through the above die, cut to a predetermined length to obtain a ceramic honeycomb green body. Each ceramic honeycomb green body of Examples 1-3 integrally comprised, as shown in FIG. 1(a), square-lattice-cross-sectioned cell walls defining pluralities of longitudinal flow paths, and an outermost peripheral cell wall having an outer peripheral surface shape reflecting the square lattice shapes of the cell walls; and the ceramic honeycomb green body of Comparative Example 1 was, as shown in FIGS. 10(a) and 10(b), a skinless honeycomb green body 50 comprising end portions 55 of cell walls 52 exposed to the peripheral side without having an outermost peripheral cell wall in the honeycomb green body.

Each green body was dried, and then sintered at 1410° C. to obtain a cordierite-type ceramic honeycomb body having an outer diameter of 264 mm, a length of 305 mm, a cell wall thickness of 0.13 mm, a flow path pitch of 1.57 mm, and a cell wall porosity of 61%. The outer peripheral wall thickness and cell wall thickness of these ceramic honeycomb bodies are shown in Table 2. The outer diameter is a diameter of the smallest circle entirely including the outer peripheral cell wall 12a, namely a diameter of a cylinder circumscribed on the ceramic honeycomb body.

TABLE 2

| No. | t[1] (mm) | T[2] (mm) | T/t | $X_1$[3] (mm) | $X_2$[4] (mm) | $X_2/X_1$ |
|---|---|---|---|---|---|---|
| Example 1 | 0.13 | 0.2 | 1.7 | 264 | 256 | 0.97 |
| Example 2 | 0.13 | 0.5 | 4.2 | 264 | 248 | 0.94 |
| Example 3 | 0.13 | 0.8 | 5.8 | 264 | 240 | 0.91 |
| Com. Ex. 1 | 0.13 | — | — | — | — | — |

Note:
[1] Cell wall thickness t.
[2] The minimum thickness T of the outer peripheral cell wall.
[3] $X_1$ represents a diameter of the minimum circle circumscribed on the outer peripheral cell wall.
[4] $X_2$ represents a diameter of the largest circle inscribed in the outer peripheral cell wall.

A coating material comprising aggregate and an inorganic binder shown in Table 3, and methylcellulose (organic binder) and water was applied to an outer peripheral surface of each ceramic honeycomb body, and dried at 1400C for 2 hours to obtain a cylindrical ceramic honeycomb structure having a diameter of (outer diameter of ceramic honeycomb body+2 mm).

TABLE 3

| | Aggregate | | Inorganic Binder | |
|---|---|---|---|---|
| No. | Type | Average Particle Size (μm) | Type and Concentration [1] | Amount [2] (% by mass) |
| Example 1 | Cordierite | 10 | Colloidal Silica (20) | 20 |
| Example 2 | Cordierite | 10 | Colloidal Silica (20) | 20 |
| Example 3 | Cordierite | 10 | Colloidal Silica (20) | 20 |
| Com. Ex. 1 | Cordierite | 10 | Colloidal Silica (20) | 20 |

Note:
[1] The concentration is expressed by "% by mass."
[2] The amount of the inorganic binder per aggregate.

With respect to Examples 1-3 and Comparative Example 1, evaluation was conducted on the degree of flow path deformation $D_1/D_0$ of the ceramic honeycomb body before applying the coating material to the outer peripheral surface, handling damage during applying the coating material, and the isostatic strength of the ceramic honeycomb structure obtained by applying the coating material to the outer peripheral surface.

Degree of Flow Path Deformation

The degree of flow path deformation was evaluated by a ratio $D_1/D_0$, wherein $D_1$ represents a diameter of the largest circle inscribed in an arbitrary outermost flow path cell wall, which was determined by the maximum diameter of a circular-cross-sectioned steel wire insertable into the arbitrary outermost flow path, and $D_0$ represents a design diameter of an undeformed ideal flow path. The degree of flow path deformation $D_1/D_0$ was measured on 20 arbitrarily selected outermost flow paths, and the measured values were averaged. The results are shown in Table 4.

Damage in Handling

In the step of applying a coating material to the outer peripheral surface of the ceramic honeycomb green body, damage generated on the outer peripheral surface was observed by the naked eye. The evaluation results are expressed by "No" when no damage was found, and "Yes" when at least one damage was found.

Isostatic Strength

The isostatic strength test was conducted according to the Japanese Automobile Standard Organization (JASO) standard M505-87 of the Society of Automotive Engineers of Japan. With both axial end surfaces of the ceramic honeycomb structure sealed with 20-mm-thick aluminum plates, and a 2-mm-thick rubber sheet attached to the outer peripheral wall surface, each ceramic honeycomb structure sample was put in a pressure container, into which water was charged to apply isostatic pressure to the outer peripheral wall surface. Pressure measured when the ceramic honeycomb structure was broken was regarded as isostatic strength. The isostatic strength was evaluated by the following standard:

Excellent: The isostatic strength was 2 MPa or more;
Good: The isostatic strength was 1.5 MPa or more and less than 2 MPa;
Fair: The isostatic strength was 1.0 MPa or more and less than 1.5 MPa;
and Poor: The isostatic strength was less than 1.0 MPa.
The results are shown in Table 4.

TABLE 4

| No. | Degree of Flow Path Deformation $D_1/D_0$ | Isostatic Strength | Damage in Handling |
| --- | --- | --- | --- |
| Example 1 | 0.97 | Good | No |
| Example 2 | 0.97 | Good | No |
| Example 3 | 0.96 | Good | No |
| Com. Ex. 1 | 0.75 | Poor | Yes |

It is clear from Table 4 that the ceramic honeycomb structures of Examples 1-3 of the present invention had low degrees of flow path deformation and good isostatic strength. On the other hand, the outer peripheral wall was easily damaged in Comparative Example 1, suffering poor isostatic strength.

What is claimed is:

1. A method for producing a ceramic honeycomb structure comprising (i) a ceramic honeycomb body having pluralities of longitudinal flow paths partitioned by square-lattice-cross-sectioned cell walls and (ii) an outer peripheral wall formed on an outer periphery of said ceramic honeycomb body, comprising the steps of
  extrusion-molding a moldable ceramic material to form a ceramic honeycomb green body integrally comprising square-lattice-cross-sectioned cell walls defining pluralities of longitudinal flow paths, and an outer peripheral cell wall having an outer peripheral surface shape reflecting the square lattice shapes of said cell walls for constituting an outermost periphery of said ceramic honeycomb body;
  drying and sintering said ceramic honeycomb green body to obtain said ceramic honeycomb body; and
  applying a coating material to an outer peripheral surface of said outer peripheral cell wall of said ceramic honeycomb body, and heat-treating said coating material to form said outer peripheral wall, thereby producing said ceramic honeycomb structure;
  a die used in said extrusion-molding step comprising a die body comprising supply holes for supplying said moldable ceramic material, and square-lattice-patterned slits formed on the opposite surface side to a surface apertured for having said supply holes, such that said square-lattice-patterned slits are communicating with said supply holes to extrusion-mold said moldable ceramic material supplied through said supply holes to a honeycomb shape, and a guide ring arranged on the square-lattice-patterned slits surface side for regulating an outer peripheral surface shape of said outer peripheral cell wall of said ceramic honeycomb green body;
  the square-lattice-patterned slits surface side having a cell-walls-forming region for forming said square-lattice-cross-sectioned cell walls, and an outer peripheral region positioned outside said cell-walls-forming region via a step H, such that said cell-walls-forming region constitutes an elevated surface;
  said cell-walls-forming region having an outer peripheral shape reflecting the square lattice shapes of said slits;
  an outer periphery of said cell-walls-forming region being in accordance with inside surfaces of slits defining said outer peripheral cell wall;
  said guide ring comprising a surface in contact with said outer peripheral region of the square-lattice-patterned slits surface side, a non-contact surface providing a clearance L with said outer peripheral region to supply said moldable ceramic material for forming said outer peripheral cell wall, and an inner peripheral surface having a shape along said outer peripheral shape of said cell-walls-forming region;
  said clearance L being constant and smaller than said step H;
  said square-lattice-patterned slits communicating with said supply holes in said outer peripheral region having a constant length;
  a ratio T/t of a minimum thickness T of said outer peripheral cell wall to a thickness t of said cell walls meeting $1 < T/t \leq 5$; and
  the outer peripheral cell wall having thicknesses measured in arbitrary directions perpendicular to the cell walls, and said minimum thickness T being a minimum of the thicknesses of the outer peripheral cell wall measured in arbitrary directions perpendicular to the cell walls,
  wherein the moldable ceramic material for forming the outer peripheral cell wall does not receive a force toward a center of the honeycomb green body.

2. The method for producing a ceramic honeycomb structure according to claim 1, wherein the ratio T/t meets $3 \leq T/t \leq 5$.

3. The method for producing a ceramic honeycomb structure according to claim 1, wherein said coating material comprises ceramic aggregate particles and an inorganic binder as main components.

4. The method for producing a ceramic honeycomb structure according to claim 3, wherein said ceramic aggregate particles are made of at least one selected from the group consisting of cordierite, silica, alumina, mullite, silicon carbide, silicon nitride and aluminum titanate.

5. The method for producing a ceramic honeycomb structure according to claim 1, wherein said thickness t of said cell wall is less than 0.15 mm.

6. The method for producing a ceramic honeycomb structure according to claim 1, wherein said inside surfaces of said slits defining the outer peripheral cell wall are parallel to an extrusion direction.

7. A method for producing a ceramic honeycomb structure comprising (i) a ceramic honeycomb body having pluralities of longitudinal flow paths partitioned by square-lattice-cross-sectioned cell walls and (ii) an outer peripheral wall formed on an outer periphery of said ceramic honeycomb body, comprising the steps of
  extrusion-molding a moldable ceramic material to form a ceramic honeycomb green body integrally comprising square-lattice-cross-sectioned cell walls defining pluralities of longitudinal flow paths, and an outer peripheral cell wall having an outer peripheral surface shape reflecting the square lattice shapes of said cell walls for constituting an outermost periphery of said ceramic honeycomb body;
  drying and sintering said ceramic honeycomb green body to obtain said ceramic honeycomb body; and
  applying a coating material to an outer peripheral surface of said outer peripheral cell wall of said ceramic honeycomb body, and heat-treating said coating material to form said outer peripheral wall, thereby producing said ceramic honeycomb structure;
  a die used in said extrusion-molding step comprising a die body comprising supply holes for supplying said moldable ceramic material, and square-lattice-patterned slits formed on the opposite surface side to a surface apertured for having said supply holes, such that said square-lattice-patterned slits are communicating with said supply holes to extrusion-mold said moldable ceramic material supplied through said supply holes to a honeycomb shape, and a guide ring arranged on the square-lattice-patterned slits surface side for regulating an outer peripheral surface shape of said outer peripheral cell wall of said ceramic honeycomb green body;

the square-lattice-patterned slits surface side having a cell-walls-forming region for forming said square-lattice-cross-sectioned cell walls, and an outer peripheral region positioned outside said cell-walls-forming region via a step H, such that said cell-walls-forming region constitutes an elevated surface;

said cell-walls-forming region having an outer peripheral shape reflecting the square lattice shapes of said slits;

an outer periphery of said cell-walls-forming region being in accordance with inside surfaces of slits defining said outer peripheral cell wall;

said guide ring comprising a surface in contact with said outer peripheral region of the square-lattice-patterned slits surface side, a non-contact surface providing a clearance L with said outer peripheral region to supply said moldable ceramic material for forming said outer peripheral cell wall, and an inner peripheral surface having a shape along said outer peripheral shape of said cell-walls-forming region;

said clearance L being constant and smaller than said step H;

said square-lattice-patterned slits communicating with said supply holes in said outer peripheral region having a constant length;

a ratio T/t of a minimum thickness T of said outer peripheral cell wall to a thickness t of said cell walls meeting $1<T/t \leq 5$; and the outer peripheral cell wall having thicknesses measured in arbitrary directions perpendicular to the cell walls, and said minimum thickness T being a minimum of the thicknesses of the outer peripheral cell wall measured in arbitrary directions perpendicular to the cell walls, wherein said ceramic honeycomb structure consists of (i) said ceramic honeycomb body and (ii) said outer peripheral wall, and wherein said ceramic honeycomb structure is a cylindrical ceramic honeycomb structure.

* * * * *